US012571472B2

(12) United States Patent　　　(10) Patent No.:　US 12,571,472 B2

Miller　　　　　　　　　　　　　　(45) Date of Patent:　Mar. 10, 2026

(54) PISTON SEAL RING

(71) Applicant: RTX Corporation, Farmington, CT (US)

(72) Inventor: Jonathan L. Miller, Belchertown, MA (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/242,188

(22) Filed: Sep. 5, 2023

(65) Prior Publication Data

US 2024/0077031 A1　　　Mar. 7, 2024

Related U.S. Application Data

(60) Provisional application No. 63/404,121, filed on Sep. 6, 2022.

(51) Int. Cl.
| | |
|---|---|
| *F16J 9/20* | (2006.01) |
| *F01D 11/00* | (2006.01) |
| *F02C 7/28* | (2006.01) |
| *F16J 9/08* | (2006.01) |

(Continued)

(52) U.S. Cl.
CPC .................. *F16J 9/20* (2013.01); *F16J 9/08* (2013.01); *F16J 15/164* (2013.01); *F16J 15/38* (2013.01); *F01D 11/003* (2013.01); *F02C 7/28* (2013.01)

(58) Field of Classification Search
CPC .... F16J 15/164; F16J 15/3412; F16J 15/3416; F16J 15/342; F16J 15/3488; F16J 15/38; F16J 15/441; F16J 15/442; F16J 9/08; F16J 9/20; F01D 11/003; F05D 2240/55; F05D 2240/58; F02C 7/28
See application file for complete search history.

(56) References Cited

U.S. PATENT DOCUMENTS

| | | | | |
|---|---|---|---|---|
| 3,743,303 A | * | 7/1973 | Pope ...................... | F16J 15/441 |
| | | | | 277/928 |
| 4,207,800 A | | 6/1980 | Homuth | |

(Continued)

FOREIGN PATENT DOCUMENTS

| | | |
|---|---|---|
| EP | 2570612 A1 | 3/2013 |
| EP | 3438417 A1 | 2/2019 |
| WO | 2015/065731 A1 | 5/2015 |

OTHER PUBLICATIONS

European Search Report dated Jan. 26, 2024 for European Patent Application No. 23195545.1.

*Primary Examiner* — Nicholas L Foster

(74) *Attorney, Agent, or Firm* — Bachman & LaPointe, P.C.

(57)　　　　ABSTRACT

A split ring seal has: a first circumferential end and a second circumferential end; an inner diameter surface and an outer diameter surface; a first axial end face and a second axial end face. The outer diameter surface has a sealing surface. The first axial end face has: a first section; a second section outboard of the first section; and an axial protrusion between the first section and the second section The second axial end face has: a first sealing surface; a second sealing surface radially outboard of the first sealing surface; a circumferential channel between the first surface and the second sealing surface; and a plurality of channels extending radially outward from the circumferential channel.

22 Claims, 7 Drawing Sheets

(51) Int. Cl.
  *F16J 15/16*        (2006.01)
  *F16J 15/38*        (2006.01)

(56)              References Cited

U.S. PATENT DOCUMENTS

|  |  |  |  |  |
|---|---|---|---|---|
| 4,783,179 | A * | 11/1988 | Katayama | F16C 27/02 |
|  |  |  |  | 384/131 |
| 5,106,208 | A | 4/1992 | Bobo et al. |  |
| 5,518,256 | A * | 5/1996 | Gaffal | F16J 15/441 |
|  |  |  |  | 277/422 |
| 9,316,119 | B2 * | 4/2016 | Sonokawa | F16J 15/441 |
| 9,970,549 | B2 | 5/2018 | Miller |  |
| 9,982,553 | B2 * | 5/2018 | Miller | F04D 29/10 |
| 9,982,604 | B2 * | 5/2018 | Miller | F01D 25/183 |
| 10,094,472 | B2 | 10/2018 | Schroder |  |
| 10,337,330 | B2 | 7/2019 | Conduit et al. |  |
| 10,392,953 | B2 * | 8/2019 | Miller | F16J 15/16 |
| 10,539,034 | B2 * | 1/2020 | Miller | F01D 11/003 |
| 10,788,131 | B2 | 9/2020 | Miller et al. |  |
| 11,156,294 | B2 * | 10/2021 | Theratil | F16J 15/44 |
| 11,525,515 | B2 * | 12/2022 | Zimmitti | F16J 15/28 |
| 11,713,688 | B2 * | 8/2023 | Miller | F01D 11/003 |
|  |  |  |  | 415/1 |
| 11,892,083 | B2 * | 2/2024 | Sullivan | F16J 9/20 |
| 11,946,548 | B2 * | 4/2024 | Sonokawa | F16J 15/3464 |
| 12,025,010 | B2 * | 7/2024 | Miller | F16J 15/30 |
| 12,234,733 | B1 * | 2/2025 | Van Lieu | F01D 11/005 |
| 12,264,586 | B2 * | 4/2025 | Laureano | F01D 11/003 |
| 2013/0069313 | A1 * | 3/2013 | Sonokawa | F01D 25/183 |
|  |  |  |  | 277/300 |
| 2016/0010483 | A1 * | 1/2016 | Miller | F04D 29/10 |
|  |  |  |  | 277/580 |
| 2016/0273375 | A1 * | 9/2016 | Miller | F16J 15/441 |
| 2018/0363484 | A1 * | 12/2018 | Miller | F16J 15/16 |
| 2019/0040957 | A1 * | 2/2019 | Miller | F16J 15/3452 |
| 2022/0136447 | A1 | 5/2022 | Garrison |  |
| 2023/0175409 | A1 * | 6/2023 | Miller | F01D 25/183 |
|  |  |  |  | 415/1 |
| 2023/0323950 | A1 * | 10/2023 | Sullivan | F16J 15/28 |
|  |  |  |  | 415/1 |
| 2023/0374910 | A1 * | 11/2023 | Miller | F16J 15/442 |
| 2024/0255055 | A1 * | 8/2024 | Winder | F16J 15/3488 |
| 2025/0052167 | A1 * | 2/2025 | Laureano | F01D 25/246 |

* cited by examiner

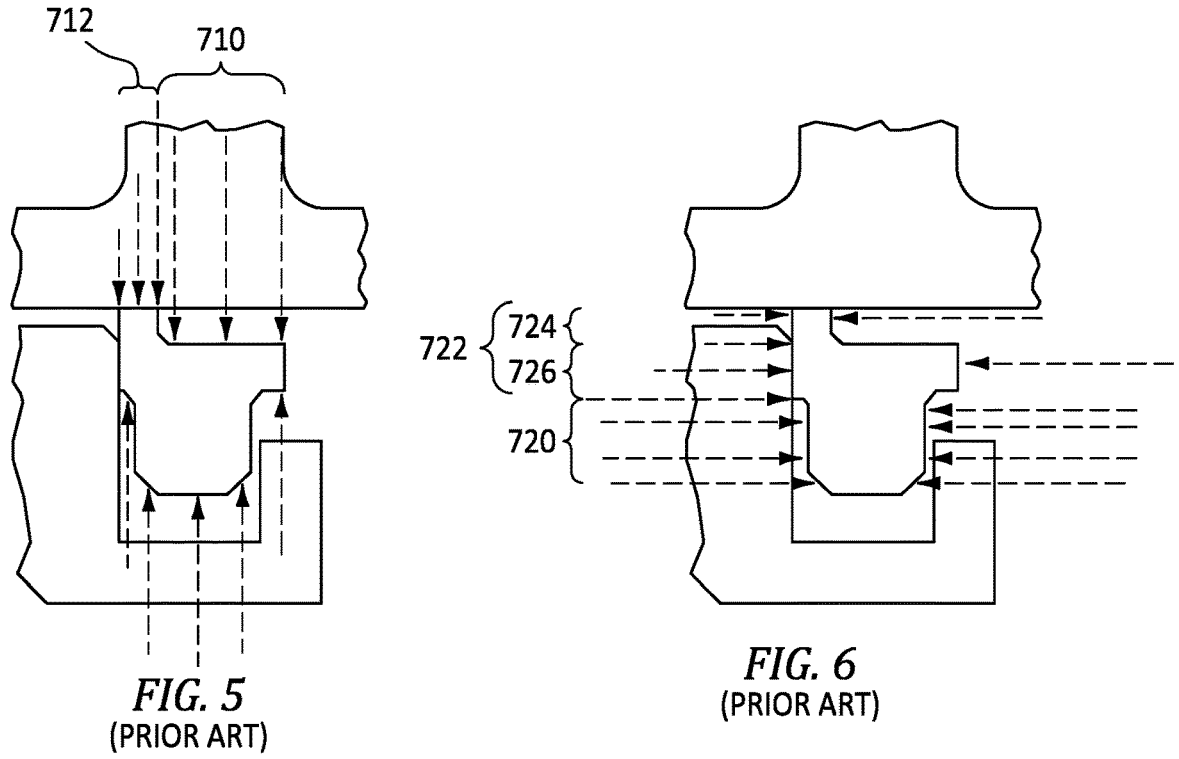
FIG. 5
(PRIOR ART)
FIG. 6
(PRIOR ART)
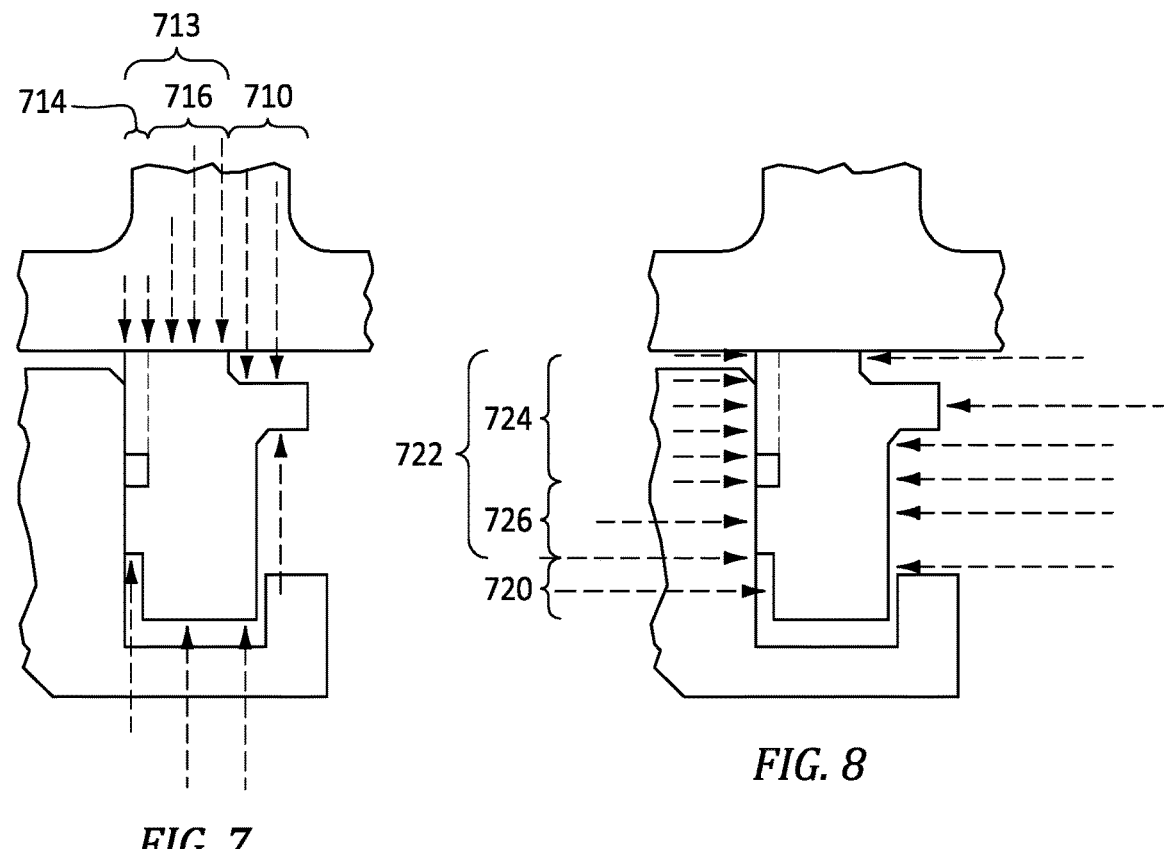
FIG. 7
FIG. 8

PISTON SEAL RING

CROSS-REFERENCE TO RELATED APPLICATION

Benefit is claimed of U.S. Patent Application No. 63/404,121, filed Sep. 6, 2022, and entitled "Piston Seal Ring" the disclosure of which is incorporated by reference herein in its entirety as if set forth at length.

BACKGROUND

The disclosure relates to gas turbine engines. More particularly, the disclosure relates to piston seal rings (PSR).

Gas turbine engines (used in propulsion and power applications and broadly inclusive of turbojets, turboprops, turbofans, turboshafts, industrial gas turbines, and the like) use PSR in several situations.

A PSR seals between an inner member and an outer member. The inner member and outer member may be static structure such as case components. Or, the inner member and the outer member may be rotating structure such as components of a spool or rotor. The inner member and the outer member may be subject to small excursions relative to each other. For example, torque loads may cause small relative rotational movements; thrust loads or differential thermal expansion may cause small relative axial movements. Vibration may also cause small relative rotational or axial movements. Such small or transient relative rotational movements, however, are distinguished from continuous relative rotational movement such as in face seal or shaft seal between two relatively rotating components (e.g., two different spools or a spool and a static structure).

The PSR is accommodated in an outer diameter groove in the inner member. Under pressure loading, the PSR seals against a sidewall of the groove and an inner diameter surface of the outer member. In one example of such a situation involving a rotor, the inner member is a shaft and the outer member is a rotor stack of the associated spool. In a more particular example, the outer member is a seal runner protruding axially from a protuberant bore of a disk of the rotor stack. Tension in the shaft holds the rotor stack in precompression. Small rotational, axial, and/or radial displacements of the shaft and seal runner may be caused by factors including transients and changes in operational conditions such as torque and thrust loads (which will vary between one steady state condition and another steady state condition).

In one example area of such a situation involving a stator, the PSR serves as a secondary seal in/for a carbon seal system. Example members are a seal carrier (carbon carrier) and a seal support of a carbon seal system. An example carbon seal system seals a bearing compartment. The bearing compartment may be at the low pressure side of the carbon seal system. In a particular example, the inner member is the seal carrier and the outer member is the seal support. Examples are seen in U.S. Pat. No. 9,970,549, Miller, May 15, 2018 and entitled "Radial coverage piston ring groove arrangement" and U.S. Pat. No. 10,788,131, Miller et al., Sep. 29, 2020, and entitled "Face seal arrangement". In such carbon seal examples, a long term continuous relative axial movement as the seal wears may be accompanied by short term movements associated with vibration, circumferential variations, temperatures, and loads.

The outer member may be part of fixed static structure such as the engine case. The seal carrier, over time, moves longitudinally/axially as the seal wears. The PSR moves with it. Additionally, small rotational, axial, and/or radial displacements of the seal carrier and seal support may be caused by factors including transients and changes in operational conditions as well as vibrations, and the like.

In some such systems, one or more bias springs (e.g., a single wave spring) biases the seal into contact with the low pressure side of the groove.

In such examples, the PSR is accommodated in an outer diameter (OD) groove in the shaft. In an operational condition where there is a pressure difference across the PSR, optimally, one axial end face of the PSR will bear against and seal against the adjacent sidewall face of the groove and the outer diameter (OD) surface of the PSR will bear and seal against the inner diameter (ID) surface of the outer member. Specifically, if a first axial end face of the PSR is subject to higher pressure than the opposite second axial end face, the pressure difference will shift the PSR so that the second axial end face seats and seals against the associated/adjacent sidewall face of the groove. However, as discussed below, the optimal situation is not always the case.

PSRs are often small in cross section so as to be relatively compliant compared to the contacting structure (e.g., members forming the groove and runner). The ring is split for assembly purposes. The ring circumferential ends may form an overlapping joint (e.g., a shiplap joint). The small cross-section and split provide the ring with little hoop strength and twist resistance. For example, with a nickel alloy shaft and nickel alloy runner, ring material may be nickel or cobalt alloy and may have generally similar material hardness (at least of a substrate if coated). Other materials include cast iron and stainless steel. If coated, example coatings are an aluminum bronze (CuAl) layer directly atop the substrate outer diameter surface and a molybdenum sulfide ($MoS_2$) layer thereatop and extending onto the substrate axial end surfaces.

For example with an inner member seal carrier and outer member support, an example coating is a full Cr plating over the entire ring surface. Also, the mating surfaces may be coated. An example inner member (groove) low pressure side surface coating is electroless Ni atop a titanium alloy or steel substrate. Example outer member inner diameter (ID) surface coatings include chrome plate, tungsten carbide-based thermal sprays, plasma sprayed aluminum oxide, and electroless nickels atop a steel or graphitic carbon substrate.

Separately, U.S. Pat. No. 10,094,472, Schroder, Oct. 9, 2018, and entitled "Piston ring sealing for pneumatic actuator" discloses in one embodiment a piston ring having a low pressure side with an annular groove and radial vents.

SUMMARY

One aspect of the disclosure involves a split ring seal having: a first circumferential end and a second circumferential end; an inner diameter surface and an outer diameter surface; a first axial end face and a second axial end face. The outer diameter surface has a sealing surface. The first axial end face has: a first section; a second section outboard of the first section; and an axial protrusion between the first section and the second section The second axial end face has: a first surface; a second surface radially outboard of the first surface; a circumferential channel between the first surface and the second surface; and a plurality of channels extending radially outward from the circumferential channel.

In a further embodiment of any of the foregoing embodiments, additionally and/or alternatively, the plurality of channels extend from the circumferential channel to the outer diameter surface.

In a further embodiment of any of the foregoing embodiments, additionally and/or alternatively, the plurality of channels circumferentially segment the first section.

In a further embodiment of any of the foregoing embodiments, additionally and/or alternatively, the plurality of channels is 5 to 50 channels.

In a further embodiment of any of the foregoing embodiments, additionally and/or alternatively, the circumferential channel and the plurality of channels have depth $(D_1)$ of 15% to 30% of a cylindrical OD surface length $L_{C1}$.

In a further embodiment of any of the foregoing embodiments, additionally and/or alternatively: a seal OD radii $(R_O)$ is between 10 cm and 40 cm; and/or a seal radial span $(H_O)$ is between 1.0 mm and 12 mm.

In a further embodiment of any of the foregoing embodiments, additionally and/or alternatively: a seal radial span $(H_O)$ is between 2% and 10% of the seal OD radii; and/or said seal radial span is between 130% and 200% of a seal axial span $(L_O)$.

In a further embodiment of any of the foregoing embodiments, additionally and/or alternatively, the axial protrusion is radially recessed from the outer diameter surface sealing surface by a distance $(H_{PR})$ of at least 30% of a seal radial span $(H_O)$.

In a further embodiment of any of the foregoing embodiments, additionally and/or alternatively, the first circumferential end and the second circumferential end form a joint.

In a further embodiment of any of the foregoing embodiments, additionally and/or alternatively, the circumferential channel has an open first end and an open second end.

In a further embodiment of any of the foregoing embodiments, additionally and/or alternatively, a radial span $(H_{C2})$ of the first surface is 15% to 40% of a seal radial span $(H_O)$.

In a further embodiment of any of the foregoing embodiments, additionally and/or alternatively, the first circumferential end and the second circumferential end form a shiplap joint.

In a further embodiment of any of the foregoing embodiments, additionally and/or alternatively, the split ring seal comprises: a metallic substrate.

In a further embodiment of any of the foregoing embodiments, additionally and/or alternatively, the split ring seal comprises a chromium-based coating In a further embodiment of any of the foregoing embodiments, additionally and/or alternatively, a machine includes the split ring seal and further comprises: an inner member; an outer member encircling the inner member; and a groove in the inner member, the split ring seal accommodated in the groove and contacting an inner diameter surface of the outer member.

In a further embodiment of any of the foregoing embodiments, additionally and/or alternatively, the machine is a gas turbine engine wherein: the inner member is a seal carrier of a carbon seal system; and the outer member is a seal support from which the seal carrier is spring biased.

In a further embodiment of any of the foregoing embodiments, additionally and/or alternatively: the groove has a first side surface, a second side surface, and a base surface; the first axial end face faces or contacts the first side surface; and the second axial end face faces or contacts the second side surface.

In a further embodiment of any of the foregoing embodiments, additionally and/or alternatively: the groove first side surface is of a distal portion of the inner member having a first outer diameter surface; and the groove second side surfaces is of a proximal portion of the inner member having a second outer diameter surface.

In a further embodiment of any of the foregoing embodiments, additionally and/or alternatively: the second axial end face has a radially inwardly and axially outwardly open ID recess extending radially inward from the first sealing surface; and a radial span $(H_{RW})$ of the ID recess radially outward from the first outer diameter surface is greater than a radial span $(H_G)$ between the second outer diameter surface and the inner diameter surface of the outer member.

In a further embodiment of any of the foregoing embodiments, additionally and/or alternatively: the second axial end face has a radially inwardly and axially outwardly open ID recess extending radially inward from the first sealing surface; a depth $(D_R)$ of the ID recess is 10% to 30% of the groove length $(L_G)$; and/or a length $(L_1)$ from the ID recess to an axial end of the protrusion is greater than the groove length $(L_G)$.

In a further embodiment of any of the foregoing embodiments, additionally and/or alternatively: a radial span $(H_{IDG})$ between the groove base surface and the seal inner diameter surface is greater than a radial span $(H_G)$ between the first outer diameter surface and the inner diameter surface of the outer member.

In a further embodiment of any of the foregoing embodiments, additionally and/or alternatively: a radial overlap $(H_{RO})$ of the distal portion of the inner member and the seal is 15% to 25% of a seal radial span $(H_O)$.

In a further embodiment of any of the foregoing embodiments, additionally and/or alternatively: a radial span $(H_{PO})$ between an underside of the protrusion to the OD sealing surface is greater than twice a radial span $(H_{GB})$ between the second outer diameter surface at a contact with the PSR second axial end face and the inner diameter surface of the outer member.

In a further embodiment of any of the foregoing embodiments, additionally and/or alternatively: a seal axial span $(L_O)$ is between 110% and 150% of a groove axial length.

In a further embodiment of any of the foregoing embodiments, additionally and/or alternatively: the groove has a low pressure side bevel having a radial span $H_B$ of 10% to 35% of a radial span $(H_{S1})$ of the seal outboard of the circumferential channel.

In a further embodiment of any of the foregoing embodiments, additionally and/or alternatively, a method for using the machine comprises: creating a pressure difference across the split ring seal; and the pressure difference acting to bias the second axial end face into sealing contact with a sidewall of the groove.

Another aspect of the disclosure involves an apparatus comprising: an inner member; an outer member encircling the inner member; a split ring seal accommodated in a groove in the inner member and contacting a surface of the outer member, the groove having a first side, a second side, and a base joining the first side and the second side; and means for increasing pressure-induced radial and axial contact forces between the seal and the outer member and the groove, respectively.

In a further embodiment of any of the foregoing embodiments, additionally and/or alternatively, the split ring seal comprises: a first circumferential end and a second circumferential end; an inner diameter surface and an outer diameter surface; and a first axial end face and a second axial end face, wherein: the first circumferential end and the second circumferential end form a joint; and the means comprises a circumferential channel and a plurality of radial channels in the second axial end face.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 5 is a radial pressure diagram of a baseline PSR.

FIG. 6 is an axial pressure diagram of the baseline PSR.

FIG. 7 is a radial pressure diagram of the FIG. 1 PSR.

FIG. 8 is an axial pressure diagram of the FIG. 1 PSR.

Like reference numbers and designations in the various drawings indicate like elements.

DETAILED DESCRIPTION

Oil containment and oil loss characteristics have become more vital to engine program metrics and customer satisfaction. Relative to a baseline piston seal ring (PSR) lacking a bias spring, embodiments of the present PSR may reduce the pressure differential required to seat the ring axially and provide a given level of sealing. Relative to a PSR biased by a pre-load spring, embodiments of the present PSR may reduce complexity, expense, and special tooling requirements.

Figure 3:
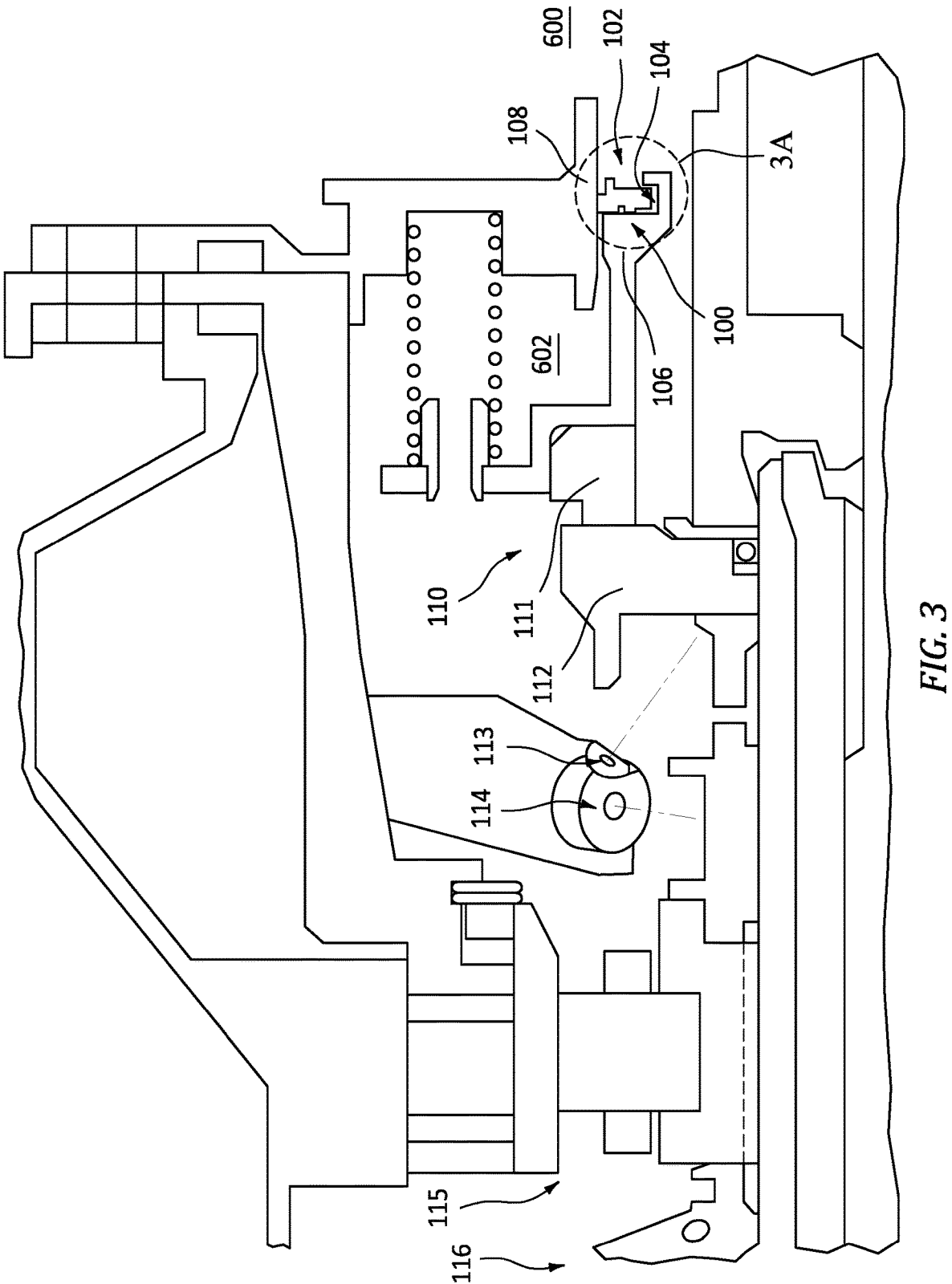
FIG. 3 is an axial cross-sectional view of the PSR installed/sealing between an inner member and an outer member.

FIG. 3 shows a sealing system 100 including a piston seal ring (PSR) 102 seated in an outer diameter (OD) groove 104 in an inner member 106 (e.g., a carbon carrier of a carbon seal system 110) and sealing against an inner diameter (ID) surface of an outer member 108 (e.g., a seal housing/support of the carbon seal system). The sealing is between a first region or volume 600 and a second region or volume 602. In an example dynamic operating condition, the first region is a high(er) pressure region (e.g., a buffer cavity) and the second region is a low(er) pressure region (e.g., a bearing compartment from which buffer air in the buffer cavity counters oil leaks) so that the pressure difference biases the PSR so that the axial end face to the low pressure side of the PSR contacts the groove sidewall to the low pressure side and there is an axial gap between the high pressure side axial end face of the PSR and the high pressure side sidewall of the groove. FIG. 3 also shows the carbon seal 111, the seat 112 for the carbon seal, oil nozzles 113, 114, the roller bearing 115, and a second carbon seal system 116 at a forward end of the bearing compartment.

Figures 1, 2:
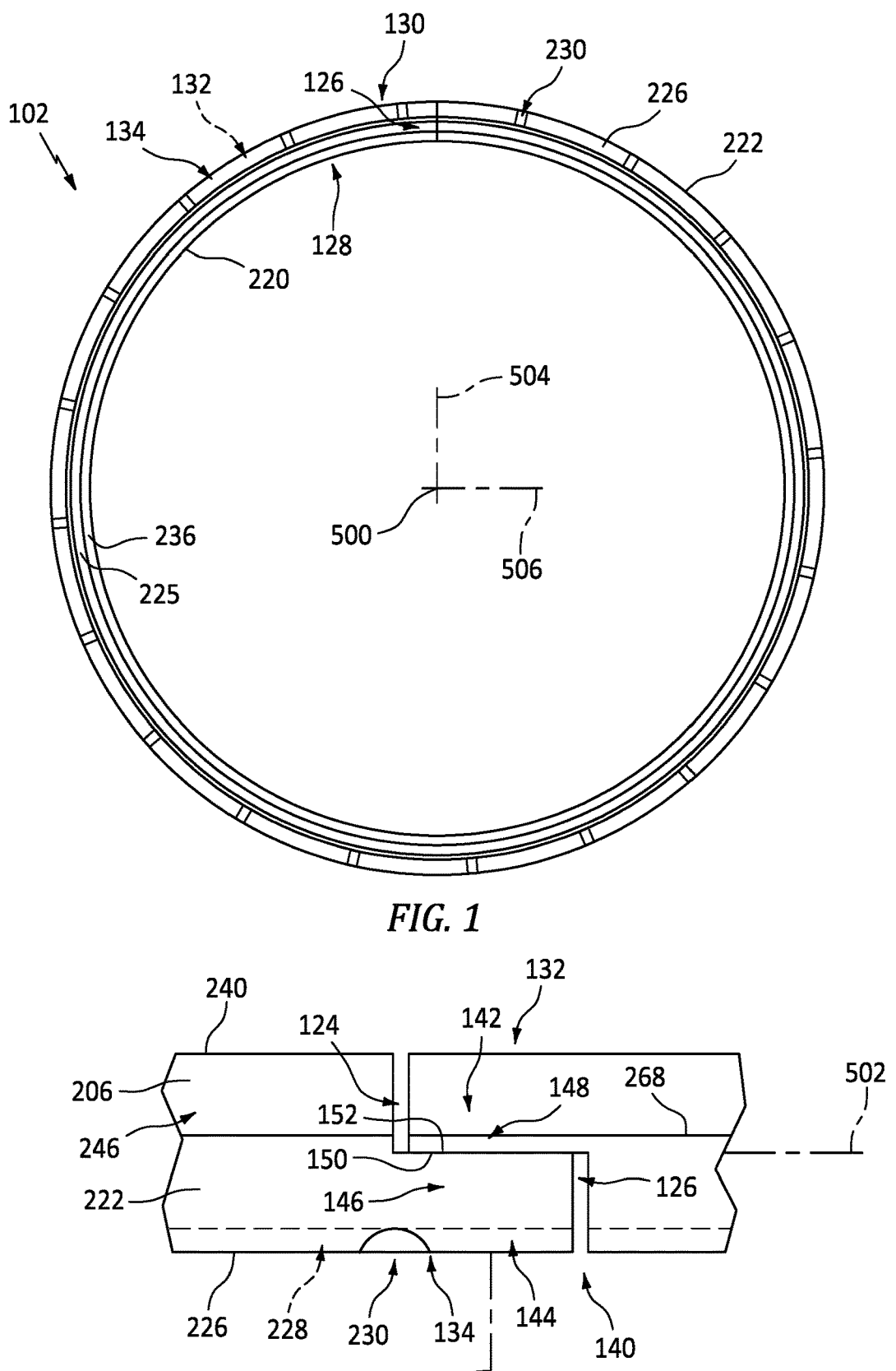
FIG. 1 is an axial end face/plan view (low pressure end face) of a piston seal ring (PSR).
FIG. 2 is an inward radial view of a joint of the PSR.

FIGS. 1 and 2 show the PSR formed as a split ring seal having a first circumferential end 124 (FIG. 2), a second circumferential end 126, an inner diameter (ID) surface 128 (FIG. 1), an outer diameter (OD) surface 130, a first axial end face 132 (FIG. 2), and a second axial end face 134. The PSR has a nominal central longitudinal axis (centerline) 500 shared with the members it seals (and the engine) when in a nominally centered condition. The PSR also has a pair of orthogonal longitudinal centerplanes 504 and 506 arbitrarily defined so that 504 extends centrally through a joint or junction 140.

In the example, first circumferential end 124 and second circumferential end 126 form the joint 140. The example joint 140 is a shiplap joint with a projecting portion 142 of the first circumferential end received in a rebate 148 of the second circumferential end and a projecting portion 144 of the second circumferential end received in a rebate 146 in the first circumferential end. The example projecting portions have mating faces/surfaces 150, 152 which, in the example, closely face or contact along the central transverse radial centerplane 502 (FIG. 2) of the PSR. Alternative joints include lap gap (step seal) and straight cut (butt gap).

The PSR may consist of a single alloy piece or may comprise a single alloy piece substrate with one or more coating layers along portions of its exterior surface (and thus forming associated portions of the exterior surface of the PSR). Coating thicknesses may be small enough that overall dimensions and substrate dimensions may be within ranges given.

Figure 3A:
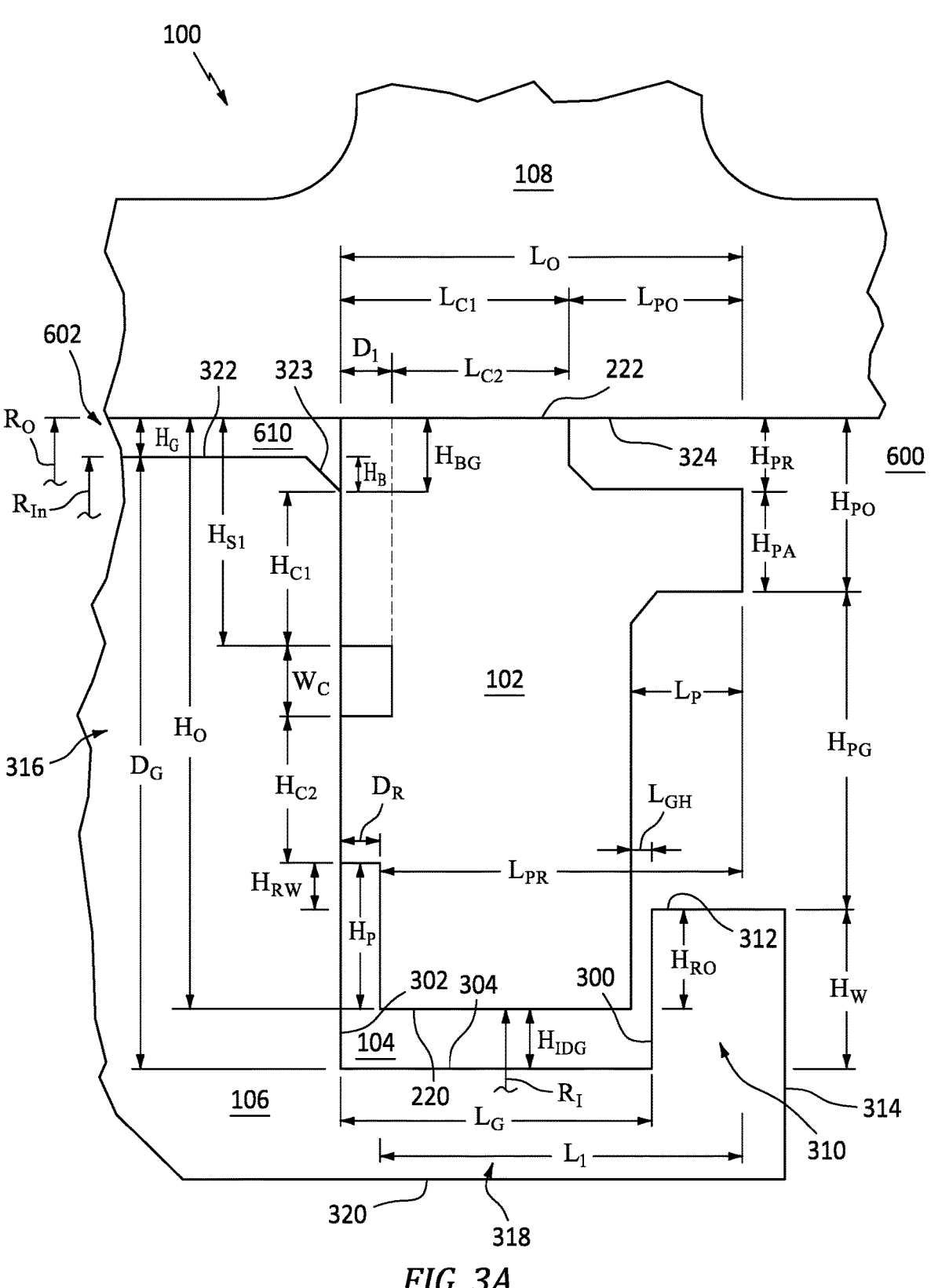
FIG. 3A is an enlarged view of the installed PSR of FIG. 3.

Viewed in central axial/radial section, FIG. 3A shows the PSR as having an inboard radial extreme formed by a generally circular cylindrical surface 220 and an outboard radial extreme formed by a generally circular cylindrical surface 222. The surface 222 forms a PSR OD sealing surface as installed/seated. Viewed in central axial/radial section, FIG. 3A shows a radius of the outer member ID surface as $R_O$ which is also the radius of the PSR OD sealing surface 222 as installed/seated. The ID surface 220 has a radius $R_I$ (e.g., measured at the minimum radius location). A PSR cross-sectional height or overall radial span $R_O$-$R_I$ is shown as $H_O$. The various PSR radii may be measured installed or relaxed or compressed maximally (the last where the circumferential ends abut) as differences will be small. If the PSR eccentric (e.g., slightly elliptical when relaxed or maximally compressed), they may be measured at the location of minimum value or at the location of mean value.

Figure 4:
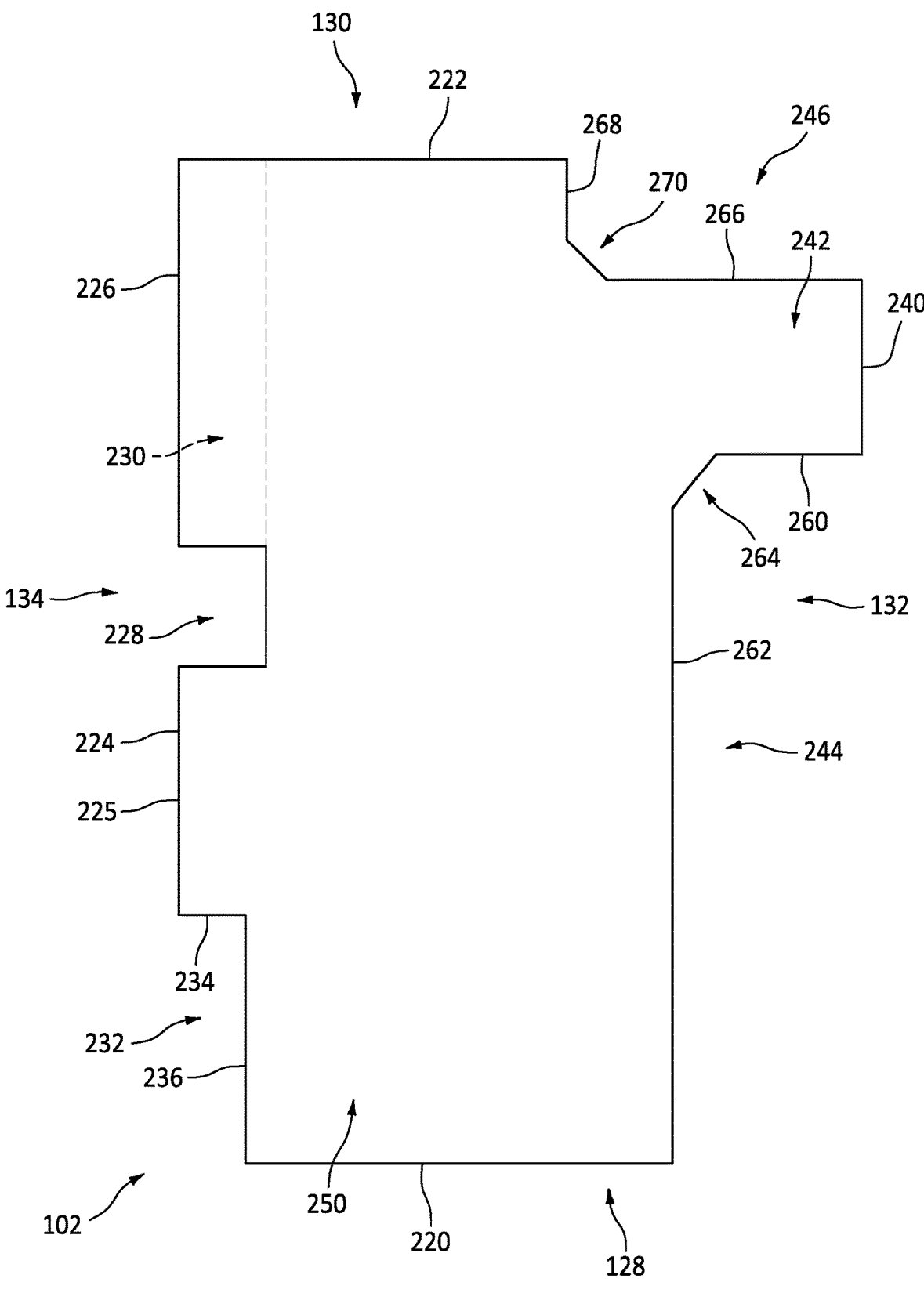
FIG. 4 is an axial cross-sectional view of the PSR.

In central axial cross-section (FIG. 4), the low pressure side axial extreme is formed by a radial/circumferential face 224 (of the second axial end 134) having an inboard section 225 and an outboard section 226 coplanar therewith and separated by a circumferential channel 228. The example channel is end-to-end with open ends at the PSR circumferential ends (rather than with blind/closed ends short thereof). As discussed further below, the outboard section 226 is itself circumferentially segmented by radial channels 230 (e.g., pressure relief channels) open to the circumferential channel 228 and open to the cylindrical OD surface 222 forming an outer radial extreme of the PSR. Radially inward of the inboard portion 225, the low pressure end of the side of the PSR has a recess or rebate 232 that extends to the inboard radial extreme 220. The example pressure relief channels 230 extend substantially exactly radially (e.g., within 1°) but others may extend radially at a greater angle off radial merely to be open to both the circumferential channel 228 and the low pressure region (more particularly also open to the OD surface 222).

The axial extreme of the high pressure side of the PSR is formed by the end face 240 of an axial protrusion or projection 242 relatively radially outboard and separating an inboard recess 244 from an outboard recess 246. An example outboard (OD) recess 246 is axially deeper than an example inboard (ID) recess 244; whereas, the inboard recess is radially deeper. The ID recess 232 on the low pressure side plus the ID recess 244 on the high pressure side leave a protruding radially inboard (ID) portion 250 axially recessed from both axial extremes 224, 240.

The example recess 232 is formed with a right angle cross-section having an axially-extending OD surface 234 and a radially-extending surface 236 extending radially inward from a junction therewith. Similarly, the high pressure side ID recess 244 has an OD surface 260 and an axially-extending surface 262 but, in the example, having a chamfered, beveled, or rounded transition 264. Similarly, the OD recess 246 has an axially-extending ID surface 266, a radially-extending surface 268 radially outboard thereof, and a transition 270. The surfaces 260 and 266 thus form respective ID and OD surface portions of the projection 242.

The groove 104 (FIG. 3A) has a high pressure side sidewall surface 300, a low pressure side sidewall surface 302 and a base surface 304 joining them. The example high pressure side sidewall surface 300 is the axially-inboard surface of a distal end wall 310 (aft end wall in the example) of the inner member 106. The end wall extends radially outward to an outboard or outer diameter (OD) surface 312 and has an outboard (aft in the example) axial end surface or face 314 opposite the surface 300. The example inner member has a proximal section 316 connected to the distal end wall 310 by an inner portion 318 itself having an inner diameter (ID) surface 320. At the low pressure side of the groove, there is a radial gap 610 between an outer diameter (OD) surface 322 of the inner member proximal section and the inner diameter (ID) surface 324 of the outer member 108.

FIG. 3 shows an example use situation wherein the sealing system 100 is used as a secondary sealing system for/of a carbon seal system sealing a bearing compartment. Thus, the low pressure side 602 is the bearing compartment interior and the high pressure side 600 may be the buffering chamber wherein higher pressure buffering air is introduced to keep lubricant within the bearing compartment. In the illustrated example, the inner member is a carbon carrier of a carbon seal system and the outer member is a portion of a stationary seal carrier which carries the carbon carrier with the carbon carrier supported relative to the seal carrier with axial spring bias to bias the seal into engagement with a seat mounted for rotation with the associated spool of the engine.

FIG. 5 shows a radial pressure diagram of a baseline PSR. FIG. 6 shows an axial pressure diagram of the baseline PSR. FIG. 7 shows a radial pressure diagram of the PSR 102. FIG. 8 shows an axial pressure diagram of the PSR 102.

Subject to minor influence of stress in the PSR, the net outward radial pressure on the PSR is offset by inward radial contact force between the PSR OD surface 222 and the outer member ID surface 324. Additionally, axial pressure is offset by contact forces between the PSR low pressure side face 224 and the groove low pressure side sidewall surface 302.

In FIG. 5 and FIG. 7, it is seen that from the baseline PSR to the PSR 102, there is a changed radial pressure distribution that results in increased contact/sealing forces. In both FIG. 5 and FIG. 7 high side pressure acts radially outward on radially inwardly facing surfaces thus producing the same outward force. On radially outwardly facing surfaces, there is an OD high pressure zone 710. The FIG. 5 inward radial pressure quickly increases from low to high along a lower pressure zone 712 formed by the relatively small and forward length of its contact surface. The lower pressure zone 712 has a progressive transition in pressure to the high pressure zone 710. In FIG. 7, the increase occurs only in a zone 716 coincident with the span $L_{C2}$ aft of the pressure relief channels because the FIG. 7 radial pressure relief channels 230 create a region/zone 714 (subregion) of uniform low pressure acting radially inward. The high pressure zone 710 is reduced in span/length relative to FIG. 5. Thus, the lower pressure zone 713 is extended relative to FIG. 5 zone 712 and divided into the constant/uniform low pressure zone 714 and the transition zone 716. Thus, net, there is more outward pressure-induced force in FIG. 7 than in FIG. 5.

In FIGS. 6 and 8, it is seen that from the baseline PSR to the PSR 102, there is a changed axial pressure distribution that results in increased contact/sealing forces. Similarly to the radial distribution, the entire radial span at the aft side of the PSR is at high side pressure in both FIGS. 6 and 8. However, just as the OD zone of lower pressure is increased in length and area in FIG. 7 (713) relative to FIG. 5 (712), the forward face (low pressure side) zone of lower pressure is increased in radial span and area in FIG. 8 relative to FIG. 6. This is similarly achieved by the circumferential channel 228 and radial pressure relief channels 230. FIG. 6 shows a low pressure side ID high pressure zone 720 with a lower pressure zone 722 radially outward therefrom. The lower pressure zone 722 comprises a uniform low pressure zone 724 and a transition zone 726. FIG. 8 shows that the circumferential channel and radial pressure relief channels greatly extend the radial spans and areas of the uniform low pressure zone 724 and the total lower pressure zone 722. Thus, essentially from the circumferential channel 228 outward the forward face of the seal is at low pressure with increase along the section 225.

In other variations, such a PSR may be carried by stationary structure and then its OD surface 222 seals against an ID surface of the seal itself or of the carbon carrier.

A PSR cross-sectional axial span or overall length (between surfaces 226 and 240) is shown in FIG. 3 as $L_O$. An overall groove radial span or depth (between surfaces 304 and 322) is shown as DG. A height of the groove high pressure side wall (between surfaces 304 and 312) is shown as $H_W$.

An axial span or length of the axial protrusion 242 is shown as LP (FIG. 3A) from the surface 262. An axial protrusion from the surface 268 at the recess 246 is shown as $L_{PO}$ ($L_O$–$L_{C1}$) and greater than LP. Additionally, FIG. 3A shows an axial distance $L_{PR}$ of the surface 240 relative to the recess surface 236. A radial span or height of the axial protrusion is shown as $H_{PA}$. The example protrusion has generally circular cylindrical distal ID and OD surface portions and the radial spans may be measured along these portions. These also form the median radial span value when the axial spans of proximal rounded or beveled transitions are smaller. For alternative shapes, the locations of median values may be used for such reference measurements.

A height of the OD radial protrusion or high pressure side OD recess 246 is shown as $H_{PR}$.

A depth of the circumferential groove 228 and of the radial venting channels 230 is shown as $D_1$. An overall length of the PSR OD sealing surface 222 is shown as $L_{C1}$. A length of the intact PSR OD sealing surface to the high pressure side of the radial channels is shown as $L_{C2}$ ($L_{C1}$ minus $D_1$).

A static gap radial span or height beyond the low pressure side bevel 323 is shown as $H_G$. An inner member radius along a cylindrical section of the surface 322 is shown as $R_{In}$. A radial span or height of the low pressure side outboard contact zone (engagement span of surfaces 226 and 302) is shown as $H_{C1}$. A radial span or height of the low pressure side inboard contact zone is shown as $H_{C2}$. In the example embodiment, $H_{C2}$ is also the radial span of the inboard sealing surface 225. The gap 610 height $H_{BG}$ at the PSR (height $H_G$ plus bevel 323 height $H_B$ between surfaces of the inner member at the groove low pressure side rim) cause the example outboard sealing surface 226 radial span to exceed $H_{C1}$ and is thus shown as $H_{S1}$. Example $H_{C2}$ is 15% to 40% of $H_O$, more particularly 15% to 30% or 20% to 30%. Example $H_{S1}$ plus channel 228 $W_C$ is 30% to 75% of $H_O$, more particularly 40% to 75% or 40% to 60%.

A groove axial span or length is shown as $L_G$. The axial span or length of a gap between the PSR ID portion 250 and the groove sidewall surface is shown as $L_{GH}$.

In the example configuration, the height or radial span $H_{RW}$ of the low pressure side recess 232 above (radially outward from) the high pressure side end wall OD surface 312 is greater than the low pressure side gap 610 height $H_G$. This helps ensure proper sealing. Specifically, for proper sealing the section of the low pressure side sidewall surface 302 contacted by the PSR should have a low roughness finish. To provide that finish, machining bit access is typically axial and thus radially limited by the end wall 310 OD surface 312. A machining bit inserted purely axially will, thus, not contact the surface 302 radially inward of the surface 312 (thus leaving a rougher inboard portion of the surface 302). Thus, throughout the PSR's range of radial excursion, the inboard radial extreme of the surface section 225 should remain in the low roughness finish area. If the low roughness finish surface ends to slightly radially outward of surface 312, then $H_{RW}$ should be correspondingly larger than $H_G$. Example $H_{RW}$ is 110% to 200% $H_G$, more particularly 110% to 150%. The example low roughness finish region is a planar region extending out to bevel 323.

Additionally, the example seal-to-groove ID height (PSR ID surface 220 to groove base surface 304) $H_{IDG}$ is greater than $H_G$ to avoid radial interference. Specifically, during radial excursions, the additional clearance allows the inner member surface 322 to locally approach and even contact the outer member surface 324 while at the same circumferential position still having ID clearance of the PSR relative to the groove surface 304 and thus not causing interference with the PSR.

Additionally, the example radial overlap $H_{RO}$ of the high pressure side end wall 310 and the PSR (maximum radius surface 222 to minimum radius of surface 220) is selected to enable installation. Specifically, the PSR is installed by expanding a split/cut/joint 140 in the hoop of the ring. This split is typically an overlapping (shiplap or angled) joint or straight cut (butt gap) joint which permits the PSR to be expanded radially to install over surface 312 of the end wall 310. Too much overlap $H_{RO}$ requires too much strain to expand the PSR to install over the end wall 310. Example $H_{RO}$ is 15% to 25% of $H_O$.

Additionally, the example radial span $H_{PO}$ from the projection underside 260 to the OD sealing surface 222 is greater than twice the low pressure side gap $H_{GB}$ (beveled end of gap) at the surface 302 contacting 226 to provide axial fool-proofing. Specifically, when inner and outer members are eccentric, this prevents reversed insertion of the PSR at the location of largest gap. Also, $H_{PG}$ is greater than twice $H_G$ to avoid radial interference (avoiding contact between surfaces 260 and 312 similarly to 220 and 304 discussed above).

However, the illustrated $H_{PG}$ is much greater than twice $H_G$. This is a result of the increase in the overall height or radial span $H_O$ relative to the baseline. The height expands due to the increase in the span from the PSR OD to the ID of the surface section 225 (combined $H_{S1}$ plus $W_C$ plus $H_{C2}$ relative to the much smaller radial span associated with zone 722 of prior art FIG. 6). The example large span $H_{PG}$ essentially preserves the radial span $H_{PA}$ of the projection 242 and its position relative to the baseline. However, further options are opened up.

For example, the radial span $H_{PA}$ may be greatly increased. All things being equal, this may provide a more rigid PSR or otherwise affect static or dynamic behavior.

A further possibility with the increased radial span $H_{PA}$ would be to approximately maintain strength while reducing the axial dimension(s) such as $L_O$, $L_G$, and the like.

Yet other variations involve shifting the projection 242 radially inward, increasing $H_{PR}$ relative to the baseline. Again, this may be advantageous in certain static or dynamic performance. This alternate configuration achieves a different cross-sectional centroid/center of mass, which may provide alternate moments and deformations of the PSR if desired, while maintaining the foolproofing and radial interference advantages discussed prior. For example, FIG. 9 shows such a PSR preserving $H_O$ and $L_O$ relative to FIG. 3A but shifting the projection 242 radially inward to increase $H_{PR}$ to a value in the range of 30% to 55% of $H_O$, more particularly 35% to 50% or 40% to 50%.

Relative to FIG. 3A, this shifts the centroid radially inward and closer to the radial center of the sealing face 225. It also brings the radial location of the projection closer to that of the centroid. Twists in the cross-section due to static or dynamic loading will have a lower impact on engagement between the sealing face 225 and the groove if the sealing face is closer to the centroid.

Figure 9:
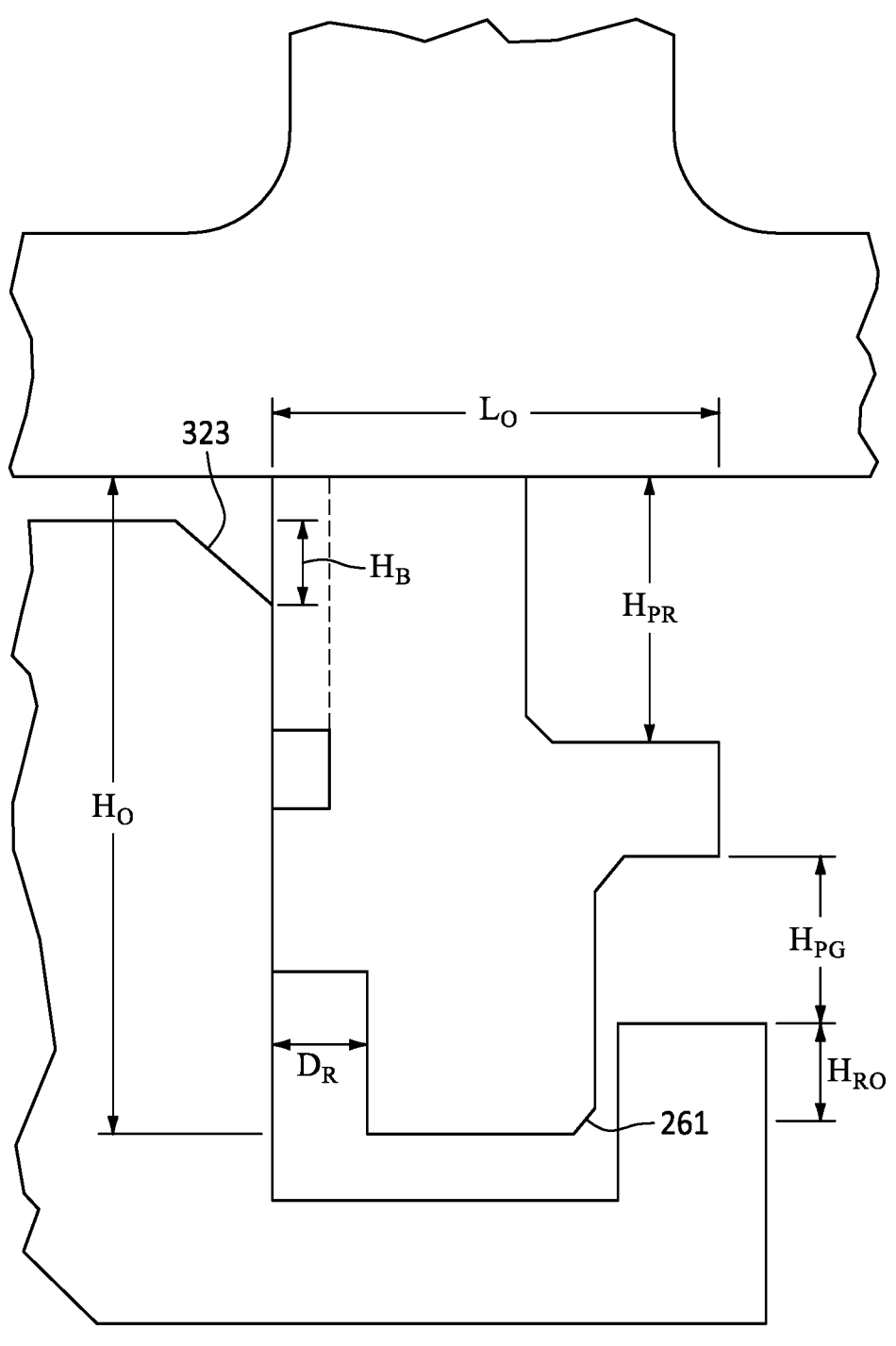
FIG. 9 is an axial cross-sectional view of an alternate PSR installed/sealing between an inner member and an outer member.

Also in FIG. 9, the groove low pressure side bevel 323 is radially deepened. This improves adhesion of the coating on the low pressure side sidewall surface 302. Specifically, during manufacture the OD surface 322 is typically masked (e.g., by a sacrificial mask or tooling) during coating (e.g., plating or thermal spray) of the surface 302. Particularly without the bevel 323, demasking may chip or peel coating off the surface 302. The presence of a bevel may limit peeling/chipping, if any, to the bevel and keep peeling/chipping from the surface 302 below the bevel. Likewise, the bevel allows the coating to extend past the surface 302 and onto the bevel without reaching the OD surface 322. Example $H_B$ is 10% to 35% of $H_{S1}$, more narrowly 15% to 35% or 15% to 30% but for larger bevels like FIG. 9, more narrowly 20% to 35%. Dimensional examples include 0.127 mm to 1.27 mm.

Also in FIG. 9, the recess 232 is axially deepened. Example axial depth $D_R$ is greater than channel depth D, for example 110% to 200% of D, more broadly, including the FIG. 3 embodiment 0% to 200% or 50% to 200%. Example axial depth $D_R$ is 10% to 30% of groove length $L_G$, more broadly, including the FIG. 3 embodiment 0% to 50% or 10% to 50%. This shifts the centroid axially toward the high pressure side and radially outward. The axial shift provides more margin for avoidance of interference with the bottom corner of 302 (e.g., allowing a large stress-reducing radius of curvature (if present—not shown) at the corner/junction of surfaces 302 and 304 without risk of interference). Again, this may be advantageous in certain static or dynamic performance. This alternate configuration achieves a different cross-sectional centroid/center of mass, which may provide alternate moments and deformations of the PSR if desired, while maintaining the foolproofing advantages discussed prior. Also, the enlargement counters the effects on centroid of the radial deepening of the recess 246. The radial shift may have a relatively small impact and thus not substantially counter the inward shift of the centroid from the projection's inward shift.

Also in FIG. 9, a high pressure side ID bevel 261 is added to the PSR. This provides interference avoidance of the PSR to the corner of 300 when eccentric as discussed prior. Example bevel 261 radial height would most commonly range 0.127-1.27 mm or 100-200% of the bottom corner radius of a fillet (if present—not shown) between surfaces 300 and 304.

Additionally, the length $L_1$ from the low pressure side ID recess (surface 236) to the high pressure side projection 242 end 240 is greater than the groove length $L_G$ to enable fool-proofing. Specifically, if one attempts to install the ring backward, the projection end will contact the low pressure side surface 302 of the groove while there is still axial overlap between the ID portion 250 of the ring and the high pressure side end wall. In the case of a beveled or chamfered intersection between the recess 232 and the ID face 220 of the ring, it may be that, upon attempted reversed installation, the bevel contacts the end wall and the PSR slightly enters the groove radially inward thereof. However, at the point of contact, if the OD of the ring is greater than $R_O$, the resulting height will still be too great to then insert the inner member/PSR combination into the outer member. Additionally, the radial span $H_{PG}$ between the projection underside 260 and the OD surface 312 of the end wall may be greater than $H_G$ to also avoid radial interference.

As noted above the seal radial span $H_O$ may increase relative to one or more reference longitudinal dimensions of a baseline being replaced. Example seal radial span $H_O$ is between 2% and 10% of the seal OD radii. Example seal radial span $H_O$ is between 130% and 200% of the seal axial span $L_O$, more narrowly 140% to 200% or 140% to 175%. Example seal radial span $H_O$ is between 150% and 350% of the groove axial span $L_G$, more particularly 200% to 300% or 200% to 250%. Example seal radial span $H_O$ is between 160% and 300% of the seal body length ($L_G$-$L_{GH}$), more particularly 200% to 300% or 200% to 250%. Example seal axial span $L_O$ is between 110% and 150% of the groove axial span $L_G$, more particularly 110% to 140% or 120% to 140%.

Further variations on PSR cross-section involve other options for chamfering, beveling, rounding, and the like at various interfaces. For example, one or both of the ID corners of ID portion 250 may be beveled, chamfered, or the like. For example, such bevel, chamfer, or the like on the low pressure side may ease ring installation (e.g., creating a camming/wedging action with the inner member end wall 310 (FIG. 3A discussed further below) to expand the PSR before it then relaxes into the groove 104). A lack of such a bevel, chamfer, or the like on the high pressure side may limit removal (e.g., limit non-destructive removal). A lack of such a relief of the high pressure side corner may also help resist accidental attempted reversed installation by not permitting such a camming/wedging action (see further discussion below). Similarly, one or both of the ID recesses 232, 244 could be otherwise formed such as via itself just becoming a single bevel or chamfer at an angle (e.g., in cross section a single diagonal surface replacing the combination of surfaces 234, 236 at a right angle to each other. Further variations may change some of the proportions. For example, the projection 242 may be shifted radially inward or otherwise reconfigured as discussed above.

Figure 10:
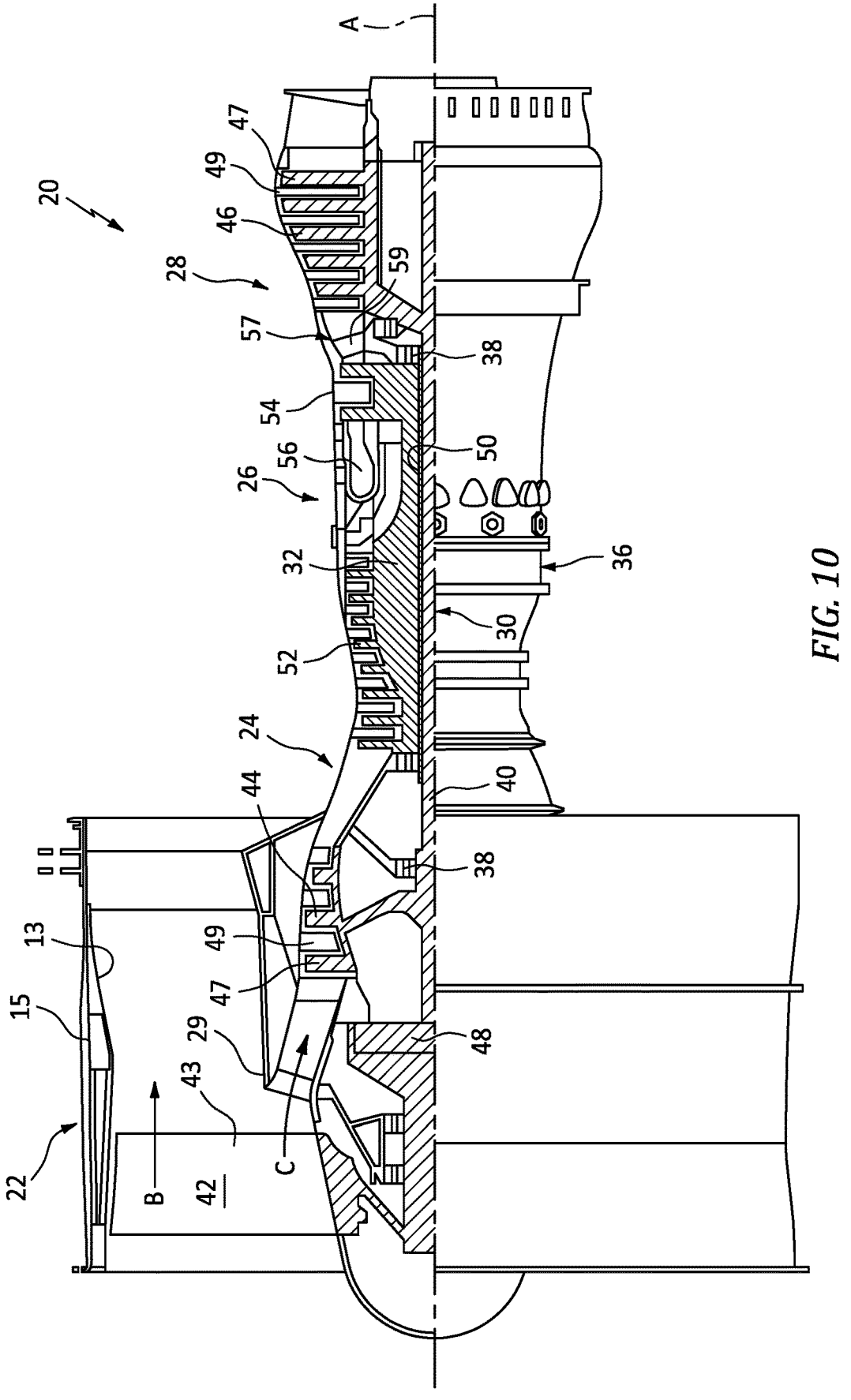
FIG. 10 is a schematized half sectional view of a gas turbine engine.

FIG. 10 is a schematized half sectional view of a gas turbine engine. FIG. 10 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the example gas turbine engine 20 is illustrated as a geared architecture 48 to drive the fan 42 at a lower speed than the low speed spool 30. The inner shaft 40 may interconnect the low pressure compressor (LPC) 44 and low pressure turbine (LPT) 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor (HPC) 52 and a second (or high) pressure turbine (HPT) 54. A combustor 56 is arranged in the example gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent the rotatable airfoils. The rotatable airfoils and vanes are schematically indicated at 47 and 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only example of one embodiment of a geared architecture engine and that the present disclosure is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Low fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The low fan pressure ratio is a spanwise average of the pressure ratios measured across the fan blade 43 alone over radial positions corresponding to the distance. The low fan pressure ratio can be less than or equal to 1.45, or more narrowly greater than or equal to 1.25, such as between 1.30 and 1.40. "Low corrected fan tip speed" is the actual fan tip speed in ft/sec divided by an industry standard temperature correction of $[(Tram \ ^\circ R)/(518.7^\circ R)]^{0.5}$. The "low corrected fan tip speed" can be less than or equal to 1150.0 ft/second (350.5 meters/second), and greater than or equal to 1000.0 ft/second (304.8 meters/second).

Component materials and manufacture techniques and assembly techniques may be otherwise conventional. Additionally, in one example, the circumferential channel and the pressure relief channels are machined into an otherwise fully formed baseline manufacture process PSR (but differing in base cross-sectional shape) by machining (e.g., via end mill or radiused cutter). Other machining examples include abrasive quills, abrasive wheels, and electrodischarge machining (EDM). In other examples, a baseline manufacture process is preserved with the channel machining added before the coating process.

In one example of a baseline process modified to add the channels, initial blanks may be cut from raw stock of nickel-based superalloy or cobalt-based superalloy (or cast iron or steel). A full annulus tube may be cut into individual seal precursors. Example stock is barstock or tube form of alloy such as AMS 5894 cobalt alloy (particularly a cobalt-based, chromium-tungsten alloy) or Inconel 718 nickel-based superalloy or steel or cast iron. Steel tubes may be forged and cut into individual precursors.

The blanks are then rough cut (e.g., via lathe) to form a rough inner diameter (ID) hole and a rough outer diameter (OD) surface.

A further lathe may precision cut OD and ID surfaces, axial end faces, ID and OD recesses/chamfers/bevels, and radii.

The joint 140 gap and circumferential end features may be cut via a CNC mill including rounding of edges and crowning as in the prior art baseline.

The ring may be formed back down to a reduced OD associated with nesting the shiplapped end features (e.g., via progressive rolling).

Heat treating may relieve residual stress.

Then, departing from the baseline, the channels (or at least pressure relief channels) may be cut. As noted above, example cutting is via CNC mill and may involve one or more radial passes per channel.

Then, as with the example baseline there may be deburring (e.g., hand deburring) and inspection.

There may be partial masking of the PSR substrate prior to application of the coating layer(s) if any (e.g., via fixturing, hard masking or in situ formed masking). Then, optionally after demasking, there may be optional precision machining (e.g., grinding/polishing) of the layer(s) for dimensions and/or finish. With the example Cr-plating of the PSR, there may be no masking.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Additional fillets, chamfers, artifacts of manufacture, and the like may be as known in the art or yet-developed. Accordingly, other embodiments are within the scope of the following claims.

What is claimed is:

1. A split ring seal comprising:
a first circumferential end and a second circumferential end;
an inner diameter surface and an outer diameter surface, the outer diameter surface having a sealing surface; and
a first axial end face and a second axial end face, wherein:
the seal comprises a metallic substrate and a coating;
the first axial end face has:
a first section;
a second section outboard of the first section; and
an axial protrusion between the first section and the second section; and
the second axial end face has:
a first surface;
a second surface radially outboard of the first surface;
a circumferential channel between the first surface and the second surface; and
a plurality of channels extending radially outward from the circumferential channel to an outboard radial extreme of the outer diameter surface.

2. The split ring seal of claim 1 wherein:
the plurality of channels segment an outboard section of the first face that extends from the circumferential channel to the outer diameter surface.

3. The split ring seal of claim 1 wherein:
the plurality of channels is 5 to 50 channels.

4. The split ring seal of claim 1 wherein:
the circumferential channel and the plurality of channels have depth ($D_1$) of 15% to 30% of a length ($L_{C1}$) of the outer diameter surface, and wherein the outer diameter surface is cylindrical.

5. The split ring seal of claim 1 wherein:
a seal outer diameter radius ($R_O$) is between 10 cm and 40 cm; and
a seal radial span ($H_O$) is between 1.0 mm and 12 mm.

6. The split ring seal of claim 5 wherein:
a seal radial span ($H_O$) is between 2% and 10% of the seal; outer diameter radius; and
said seal radial span is between 130% and 200% of a seal axial span ($L_O$).

7. The split ring seal of claim 1 wherein:
the axial protrusion is radially recessed from the outer diameter surface sealing surface by a distance ($H_{PR}$) of at least 30% of a seal radial span ($H_O$).

8. The split ring seal of claim 1 wherein:
the first circumferential end and the second circumferential end form a joint; and
the circumferential channel has an open first end and an open second end.

9. The split ring seal of claim 1 wherein:
a radial span ($H_{C2}$) of the first surface is 15% to 40% of a seal radial span ($H_O$).

10. The split ring seal of claim 1 wherein:
the first circumferential end and the second circumferential end form a shiplap joint.

11. The split ring seal of claim 1 wherein:
the coating comprises a chromium-based coating layer.

12. A machine including the split ring seal of claim 1 and further comprising:
an inner member;
an outer member encircling the inner member; and
a groove in the inner member, the split ring seal accommodated in the groove and contacting an inner diameter surface of the outer member.

13. The machine of claim 12 being a gas turbine engine wherein:
the inner member is a seal carrier of a carbon seal system;
the seal carrier carries a carbon seal;
the carbon seal is biased into engagement with a seat that rotates with an associated spool of the engine; and
the outer member is a stationary seal support from which the seal carrier is spring biased.

14. The machine of claim 12 wherein:
the groove has a first side surface, a second side surface, and a base surface;
the first axial end face faces or contacts the first side surface;
the second axial end face faces or contacts the second side surface;
the groove first side surface is of ais a distal portion of the inner member having a first outer diameter surface; and
the groove second side surfaces is of a proximal portion of the inner member having a second outer diameter surface.

15. The machine of claim 14 wherein:
the second axial end face has a radially inwardly and axially outwardly open inner diameter recess extending radially inward from the first sealing surface; and
a radial span ($H_{RW}$) of the inner diameter recess radially outward from the first outer diameter surface is greater than a radial span ($H_G$) between the second outer diameter surface and the inner diameter surface of the outer member.

16. The machine of claim 14 wherein:
the second axial end face has a radially inwardly and axially outwardly open inner diameter recess extending radially inward from the first sealing surface;
a depth ($D_R$) of the inner diameter recess is 10% to 30% of a length ($L_G$) of the groove; and
a length ($L_1$) from the inner diameter recess to an axial end of the protrusion is greater than the groove length ($L_G$).

17. The machine of claim 14 wherein:
a radial span ($H_{IDG}$) between the groove base surface and the seal inner diameter surface is greater than a radial span ($H_G$) between the first outer diameter surface and the inner diameter surface of the outer member.

18. The machine of claim 14 wherein:
a radial overlap ($H_{RO}$) of the distal portion of the inner member and the seal is 15% to 25% of a seal radial span ($H_O$).

19. The machine of claim 14 wherein:
a radial span ($H_{PO}$) between an underside of the protrusion to the sealing surface of the outer diameter surface is greater than twice a radial span ($H_{GB}$) between the second outer diameter surface at a contact with the second axial end face and the inner diameter surface of the outer member;
a seal axial span ($L_O$) is between 110% and 150% of a groove axial length; and
the groove has a low pressure side bevel having a radial span ($H_B$) of 10% to 35% of a radial span ($H_{s1}$) of the seal outboard of the circumferential channel.

20. A method for using the machine of claim 12, the method comprising:
creating a pressure difference across the split ring seal; and
the pressure difference acting to bias the second axial end face into sealing contact with a sidewall of the groove.

21. A gas turbine engine comprising:

a carbon seal system having:

a seat;

a carbon seal;

an inner member being a seal carrier carrying the carbon seal and having a groove;

an outer member being a seal support encircling the inner member;

one or more bias springs axially biasing the seal carrier from the support to bias the seal into engagement with the seat; and a split ring seal accommodated in the groove and contacting an inner diameter surface of the seal support and comprising:

a first circumferential end and a second circumferential end;

an inner diameter surface and an outer diameter surface, the outer diameter surface having a sealing surface; and a first axial end face and a second axial end face, wherein:

the first axial end face has:

a first section;

a second section outboard of the first section; and an axial protrusion between the first section and the second section; and the second axial end face has:

a first surface;

a second surface radially outboard of the first surface;

a circumferential channel between the first surface and the second surface; and a plurality of channels extending radially outward from the circumferential channel to an outermost section of the outer diameter surface.

22. The gas turbine engine of claim 21 wherein:

the groove has a first side surface, a second side surface, and a base surface;

the first axial end face faces or contacts the first side surface;

the second axial end face faces or contacts the second side surface;

the groove first side surface is a distal portion of the inner member having a first outer diameter surface; and the groove second side surfaces is of a proximal portion of the inner member having a second outer diameter surface.

\*　\*　\*　\*　\*